(12) United States Patent
Collings

(10) Patent No.: US 12,252,279 B1
(45) Date of Patent: Mar. 18, 2025

(54) DRONE SATELLITE

(71) Applicant: Jesse Deniro Collings, Stonecrest, GA (US)

(72) Inventor: Jesse Deniro Collings, Stonecrest, GA (US)

( * ) Notice: Subject to any disclaimer, the term of this patent is extended or adjusted under 35 U.S.C. 154(b) by 11 days.

(21) Appl. No.: 18/244,924

(22) Filed: Sep. 12, 2023

(51) Int. Cl.
| | |
|---|---|
| *B64U 20/50* | (2023.01) |
| *B64U 30/293* | (2023.01) |
| *B64U 70/20* | (2023.01) |
| B64U 101/20 | (2023.01) |
| B64U 101/30 | (2023.01) |

(52) U.S. Cl.
CPC .............. *B64U 70/20* (2023.01); *B64U 20/50* (2023.01); *B64U 30/293* (2023.01); *B64U 2101/20* (2023.01); *B64U 2101/30* (2023.01); *B64U 2201/10* (2023.01); *B64U 2201/20* (2023.01)

(58) Field of Classification Search
CPC ...... B64U 20/50; B64U 30/293; B64U 70/20; B64U 70/30; B64U 2101/20; B64U 2101/30; B64U 2201/10; B64U 2201/20
USPC .......................................................... 244/2
See application file for complete search history.

(56) References Cited

U.S. PATENT DOCUMENTS

| | | | |
|---|---|---|---|
| 9,421,869 B1 * | 8/2016 | Ananthanarayanan | ...................... B60L 5/005 |
| 11,372,400 B1 * | 6/2022 | Scott | .................... G05D 1/0027 |
| 2014/0217242 A1 * | 8/2014 | Muren | .................. B64U 10/17 244/4 R |
| 2016/0214717 A1 * | 7/2016 | De Silva | .................. B64D 5/00 |
| 2016/0355261 A1 * | 12/2016 | Chin | ..................... B64U 70/20 |
| 2017/0195048 A1 * | 7/2017 | Sham | ....................... H04N 7/22 |
| 2017/0369169 A1 * | 12/2017 | Lee | ......................... B64U 10/16 |
| 2018/0196425 A1 * | 7/2018 | Kobayashi | ......... H04B 7/18506 |
| 2018/0307225 A1 * | 10/2018 | Line | ..................... G05D 1/0808 |
| 2019/0176986 A1 * | 6/2019 | Addonisio | ............. B64U 70/90 |

* cited by examiner

*Primary Examiner* — Joshua E Rodden

(57) ABSTRACT

The present disclosure provides a drone system for surveying an area and transmitting collected video data to a headpiece display worn by a user operating a remote control for the drone. The drone itself includes a main drone coupled to a detachable relay drone which can disengage and be deployed therefrom mid-air in response to a detection of a loss of signal or signal quality below a predetermined threshold between the main drone and either the headpiece or the remote control. The main drone and relay drone then are programmed to fly in tandem to maintain the best signal strength until the relay drone is no longer needed at which point they can re-engage.

17 Claims, 2 Drawing Sheets

DRONE SATELLITE

FIELD OF INVENTION

The present invention relates to drone technology, specifically to a drone system that includes comprises a primary drone and a secondary drone capable of detaching and reattaching for advanced surveillance and object tracking. The present invention relates generally to drone surveillance technology. More specifically, the present invention relates to the drone which streams video data to a headpiece so that a user can view its surroundings from a first-person perspective, and which includes a detachable relay drone that flies in tandem with the main drone to improve the signal.

BACKGROUND

Drones have become increasingly popular for various applications, including surveillance, photography, and delivery services. However, current drone systems often struggle to maintain a stable hover at high altitudes and face difficulty capturing detailed images or tracking moving objects from a distance. The Sky Link Drone System aims to address these limitations by integrating a detachable secondary drone with specialized hardware and software components. The term Unmanned Aerial Vehicle (UAV) refers to an aircraft without a human pilot aboard, often also called a drone. Such UAVs often have an onboard computer for controlling flight or a wireless transceiver for receiving instructions from a pilot to remotely control the flight of the UAV.

Autonomous control is increasingly being employed in UAVs, and modern UAVs are able to transmit large amounts of data, such as live video. Such UAVs can autonomously perform military reconnaissance as well as strike missions, and can also be used for civil applications, such as nonmilitary security work, e. g., surveillance of properties and estates.

However, an issue with such surveillance operations is the reliance on a secure and stable signal connection between the drone and the viewer. Commercially available drones usually require a direct wireless connection to the remote control and display device of a user operating them in order to receive instructions and transmit video data, but this can be interrupted when obstacles are between the operator and the drone.

It is within this context that the present invention is provided.

SUMMARY

The SkyLink Drone System comprises a primary drone and a secondary drone, both equipped with advanced hardware and software components. The secondary drone can detach from the primary drone and maintain a stable hover at high altitudes, while the primary drone navigates around obstacles and captures high-resolution images and videos. The system also includes a high-frequency, long-range communication system, GPS and IMU systems, and an array of software components for flight control, object tracking, license plate recognition, camera control, data transmission, and more.

DETAILED DESCRIPTION OF THE INVENTION

I. Mechanical Components
A. Primary Drone
  1. Frame: A durable and lightweight frame to support all components.
  2. Motors: High-torque brushless motors for efficient and stable flight.
  3. Propellers: Efficient propeller design for optimum lift and maneuverability.
  4. Battery: High-capacity, rechargeable lithium-polymer (LiPo) battery.
  5. Electronic Speed Controllers (ESCs): Control the speed and direction of each motor.
  6. Landing Gear: Retractable or fixed landing gear to support the drone during landing.
  7. Detaching Mechanism: A system for securing and releasing the secondary drone (e.g., magnetic lock, mechanical clamp, or docking bay).
B. Secondary Drone
  1. Frame: A compact, lightweight frame designed for high-altitude operation.
  2. Motors: High-torque brushless motors suitable for stable hover at high altitudes.
  3. Propellers: Efficient propeller design for high-altitude operation.
  4. Battery: High-capacity, rechargeable lithium-polymer (LiPo) battery, possibly with solar cells for extended life.
  5. Electronic Speed Controllers (ESCs): Control the speed and direction of each motor.
  6. Attachment Mechanism: A system for connecting and disconnecting from the primary drone.
C. Camera System
  1. Primary Drone: A high-resolution camera with optical zoom capabilities and a gimbal stabilization system for smooth, clear footage.
  2. Secondary Drone (optional): A smaller camera system for monitoring the primary drone and its surroundings.
D. Gimbal
  A high-quality, motorized gimbal system to stabilize the camera during flight, ensuring sharp images and smooth videos.
II. Software Components
A. Flight Controller
  Software to manage flight stabilization, motor control, and navigation for both drones.
B. Communication System
  1. Communication System: A software module to handle communication between the user, secondary drone, and primary drone. This can include error correction, encryption, and signal optimization algorithms.
  2. GPS-based Positioning: Software to process GPS data and maintain the drones' position and altitude, enabling the secondary drone to hover at a designated location. and the primary drone to navigate around obstacles.
C. Autopilot and Navigation
  1. Autopilot: An autonomous flight system that allows drones to follow waypoints or pre-planned paths.
  2. Obstacle Avoidance: The system should include obstacle avoidance algorithms for the primary drone.
D. User Interface
  1. Control and Monitoring: A software application for the user to control and monitor the drones, set mission parameters, and receive live video and telemetry data.

E. Image Processing and Computer Vision
  1. Object Tracking: Advanced computer vision algorithms that can detect and track objects of interest, such as vehicles or people. These algorithms can leverage machine learning models like convolutional neural networks (CNNs) for accurate object recognition.
  2. License Plate Recognition (LPR): A specialized computer vision module that can detect, segment, and recognize license plates in real-time. This requires advanced image processing techniques and optical character recognition (OCR) algorithms optimized for license plates.
  3. Camera Control: Software to control the camera settings, such as zoom level, focus, exposure, and aperture, allowing the drone to adapt to different lighting conditions and distances.
F. Video and Image Compression
  1. Compression and Encoding: To optimize bandwidth usage and storage, you will need software to compress and encode the captured images and videos. This can be achieved using codecs like H.264 or H.265 for video and JPEG or PNG for images.
G. Data Transmission
  1. High-Speed Data Transmission: High-resolution images and videos will require a high-speed data transmission system. This can be achieved using long-range wireless communication technologies, such as 5G or custom radio frequency (RF) systems.
H. Geotagging and Timestamping
  1. Metadata Integration: To provide context for the images and videos captured, you can integrate a system that adds GPS coordinates and timestamps to the metadata of each file. This information can be useful for legal purposes, analysis, or record-keeping.
I. Security and Encryption
  1. Data Protection: To protect the privacy of the captured data, you can implement security measures, such as encryption algorithms, for both the stored data and the data transmitted between the drones and the user.
J. Data Logging and Analysis
  1. Flight Data: Software to record and analyze flight data, such as telemetry, GPS coordinates, and battery status, for post-flight review and diagnostics.
K. Firmware Updates
  1. Remote Updates: A system to update the firmware of the drones remotely, ensuring that they are always running the latest version of the software.

The present disclosure provides a drone system for surveying an area and transmitting collected video data to a headpiece display worn by a user operating a remote control for the drone. The drone itself comprises a main drone coupled to a detachable relay drone which can disengage and be deployed there from mid-air in response to a detection of a loss of signal or signal quality below a predetermined threshold between the main drone and either the headpiece or the remote control. The main drone and relay drone then are programmed to fly in tandem to maintain the best signal strength until the relay drone is no longer needed at which point, they can re-engage.

Thus, according to one aspect of the present disclosure, there is provided a drone system comprising: a main drone comprising a first propulsion system, a first power source, a first sensor array including a video camera, a first wireless communications module, a first onboard controller, and a holding cavity; a relay drone detachably connected to the holding cavity and comprising a second propulsion system, a second power source, a second sensor array, a second wireless communications module, and a second onboard controller; a remote control device configured to transmit control signals to the first and second onboard controllers; and a wearable headpiece comprising a display and being configured to receive signals from the first and second onboard controllers.

The first onboard controller is configured to transmit data captured by the first sensor array to the wearable headpiece, including a set of video data to be displayed on the display of the headpiece so that a wearer has a first-person view of the main drone's surroundings.

Furthermore, the first and second onboard controllers are configured with navigation algorithms configured to deploy and fly the relay drone from the main drone in coordinated flight so as to relay signals between the remote control/headpiece and the main drone through the relay drone in response to a detection of the main drone leaving communications range of the remote control and headpiece.

In some embodiments, the holding cavity of the main drone is fitted with one or more electromagnets operated by the first onboard controller to engage or disengage the relay drone form the cavity.

In some embodiments, the first array of sensors further comprises one or more proximity sensors for assisting with the launch and reconnection between the main drone and the relay drone. The first array of sensors may further comprise one or more infra-red sensors.

In some embodiments, the holding cavity is an indented portion in the exterior body of the main drone which is profiled and sized to accommodate the relay drone. The holding cavity may also be greater in width and volume than the relay drone to compensate for misalignment during reconnection between the main drone and the relay drone.

In some embodiments, the second propulsion system of the relay drone comprises a set of foldable propeller arms which are configured to move between a first folded position where they lie flat with the exterior surface of the relay drone body and a second extended position where they fold outwards form the relay drone body and are free to spin and propel the relay drone.

In some embodiments, the headpiece is a set of goggles.

In some embodiments, deployment of the relay drone is performed autonomously in response to a loss of signal connection between the main drone and the headpiece and remote control.

In other embodiments, deployment of the relay drone is performed autonomously in response to a detection that signal quality between the main drone and the headpiece and remote control is below a predetermined threshold.

In some embodiments, the first array of sensors comprises motion sensors and the first onboard controller is configured with algorithms for autonomous obstacle avoidance. The second array of sensors may also comprise motion sensors and the second onboard controller may also be configured with algorithms for autonomous obstacle avoidance.

In some embodiments, the navigation algorithms for coordinating flight between the relay drone and main drone comprise an artificial intelligence algorithm configured to optimise the signal between the main drone and the headpiece and remote control.

In some embodiments, the main drone is equipped with a speaker and radio system connected to a microphone and radio system installed in the headpiece or remote control, and is thus configured to relay audio from a user to its surroundings.

In some embodiments, the first onboard controller is configured to receive and fly a predetermined route.

In some embodiments, the first onboard controller is configured to receive and patrol a predetermined area including one or more checkpoints.

In some embodiments, the system further comprises one or more separate motion detectors which can be placed about a predetermined area, the motion detectors each comprising a wireless communications module configured to send an alert signal to the first onboard controller in response to a motion detection, and the first onboard controller being configured to autonomously launch and survey the area around the motion detector in response to said signal.

In some embodiments, the first onboard controller is in communication with one or more user devices over a wireless network and is configured to make accessible video data and other data recorded by the first array of sensors to the user devices.

BRIEF DESCRIPTION OF THE DRAWINGS

Various embodiments of the invention are disclosed in the following detailed description and accompanying drawings.

Figure 1:
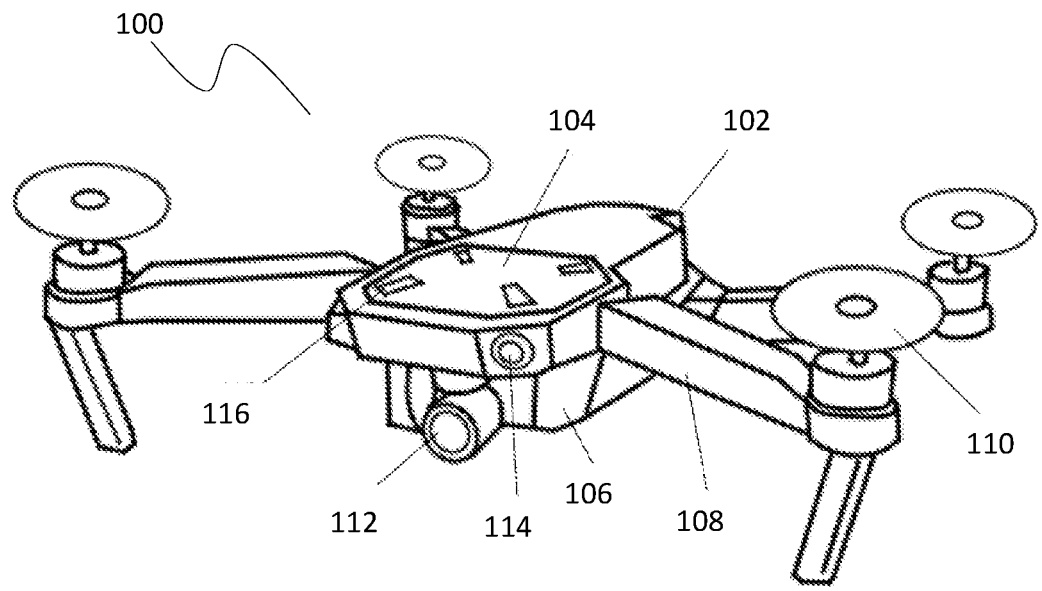
FIG. 1 illustrates an isometric view of an example configuration of a drone of the system of the present disclosure with a relay drone attached.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

The terminology used herein is for the purpose of describing particular embodiments only and is not intended to be limiting to the invention. As used herein, the term "and/or" includes any combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Referring to FIG. 1, an isometric view of an example drone 100 of the system of the present disclosure is shown, the drone comprising a main drone body 102 with a relay drone 104 attached to it.

The main drone 102 is a standard quadcopter design in the present example, though various other types of drone design can be used. The main drone comprises a housing 106 that surrounds the electronics in the main body, four arms 108 that extend outward and support the propellers 110. The housing 106 contains a power source, onboard controller, and the various other circuitry required for flight and surveillance. The functioning of quadcopter drones is well known in the art and will not be elaborated on in depth in this application.

A sensor array of the drone includes a high-definition video camera 112 and one or more motion sensors 114.

In the present example, the relay drone 104 is installed in a cavity on the top of the main drone's exterior body. The arms 116 of the relay drone are folded inwards to lie flat along the exterior profile while not deployed.

Figure 2:
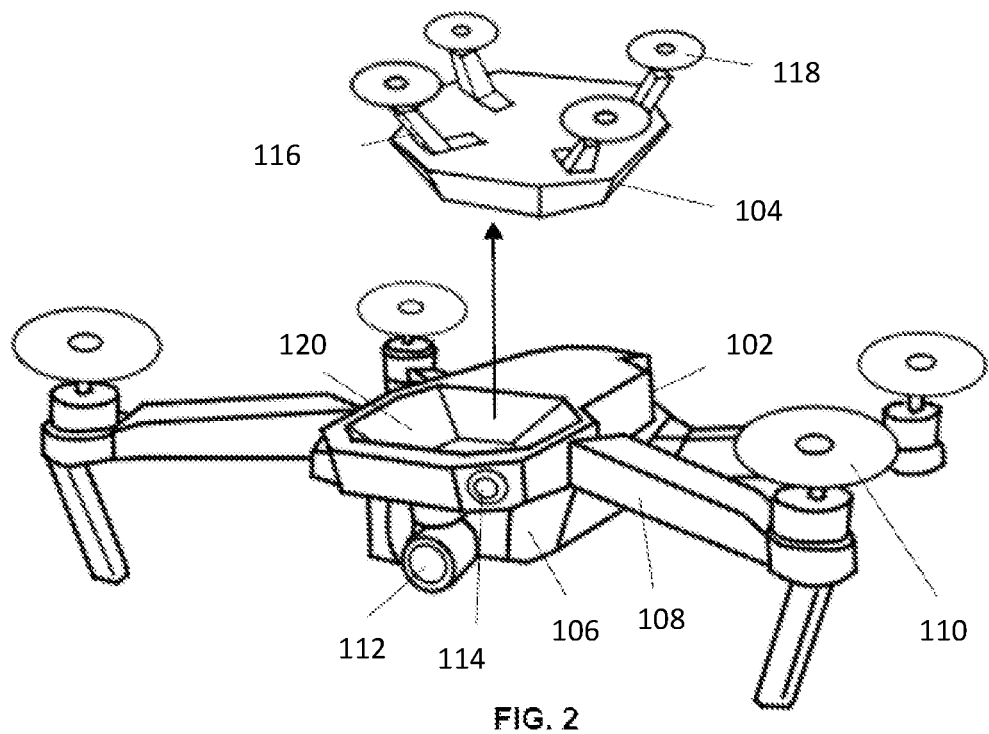
FIG. 2 illustrates an isometric view of the relay drone deploying from the main drone in the example configuration.

Referring to FIG. 2, an isometric view is shown of the relay drone 104 deploying from the main drone 102, the arms 116 of the relay drone folding outwards so that its own propellers 118 can extend and spin to propel, it through the air.

The cavity 120 configured to be seen in this second depiction as being shaped to accommodate the relay drone. The cavity 120 may be designed as being wider and of larger volume than the relay drone itself to compensate for small misalignments when the relay drone returns to and re-couples to the cavity mid-air. A plurality of electromagnets may be installed about the cavity 120 to engage/disengage the relay drone. Proximity sensors may also be installed in and around cavity 120 and on the relay drone 104 to help coordinate mid-air deployment and re-attachment.

Figure 3:
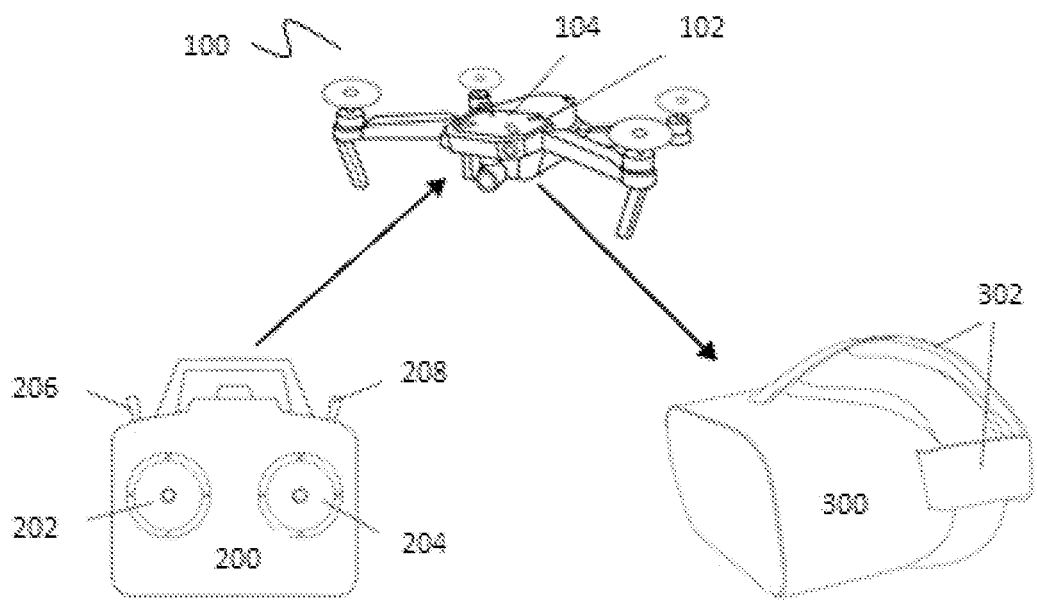
FIG. 3 illustrates the example drone in communication with a remote control device and headpiece display of the system of the present disclosure.

Referring to FIG. 3, drone couple 100 is shown in communication with a remote-control device 200 and headpiece display 300.

The remote-control device has a first toggle 202 and second toggle 204 for controlling various aspects of flight such as tilt and rotation, and a pair of graded switches 206 and 208 for controlling the thrust/RPM of the propellers, as is known in the art. The relay drone is flown autonomously, so no controls are needed.

The headpiece 300 in the present example is designed as a fully encompassing headset with a pair of goggles installed in the interior and a strap for holding it on the wearer's head in the fashion of virtual reality devices.

The onboard controller of the main drone 102 is configured to transmit data captured by the camera 112 of its sensor array to the wearable headpiece 300, including a set of video data to be displayed on the display of the headpiece so that a wearer has a first-person view of the main drone's surroundings. This allows a user to quickly and intuitively scan the environment of the drone while holding the remote-control device 200 and directing it.

The processors of both the main drone 102 and the relay drone 104 are configured with navigation algorithms configured to deploy and fly the relay drone 104 from the main drone in coordinated flight to relay signals between the remote control 200/headpiece 300 and the main drone through the relay drone 104 in response to a detection of the main drone leaving communications range of the remote control and headpiece. This may involve a complete loss of signal or simply poor signal quality. For example, if the main drone moves behind an object the signal may be lost completely, but if it is just slightly out of the optimum communications range from the user the signal quality will merely deteriorate, and the relay drone configured to be used as a signal booster.

The controller 200 or headpiece 300 may also be equipped with a microphone and two-way radio connected to a corresponding radio and speaker device on the main drone, allowing a user to convey their voice to an environment in the immediate vicinity of the main drone, for example, to warn trespassers to leave property under surveillance by the drone.

Figure 4:
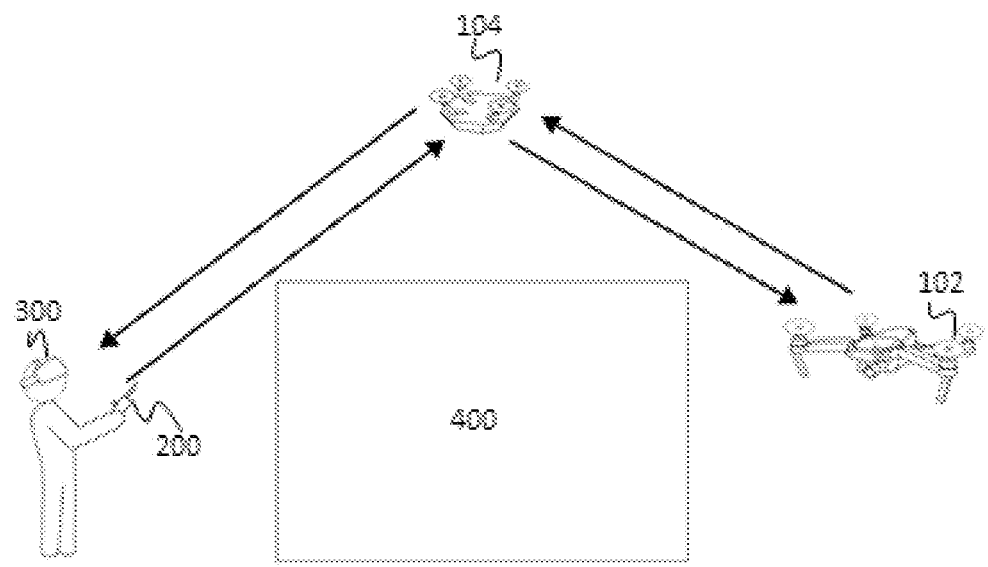
FIG. 4 illustrates a user controlling the example drone and viewing captured video data via the headpiece while the relay drone manoeuvres to maintain the signal connection between the user and the drone around an obstacle.

Referring to FIG. 4, a user is shown wearing the headpiece 300 and holding the remote control 200 to operate the main drone 102 which is behind obstacle 400, with the relay drone 104 autonomously positioning itself to maintain the best signal strength.

The navigation algorithms for coordinating flight between the relay drone 102 and main drone 104 may comprise an artificial intelligence algorithm configured to optimize the signal between the main drone and the headpiece and remote control. Both drones may similarly be equipped with motion sensors and artificial intelligence for autonomous obstacle avoidance.

The navigation algorithms on the drone can cause it to act autonomously, such as for example causing it to fly a predetermined route entered by a user on a regular basis, or to randomly patrol a predetermined area including one or more checkpoints that it must pass by.

The system may also for example include one or more separate stationary motion detectors which can be placed about a predetermined area, the motion detectors each comprising a wireless communications module configured to send an alert signal to the main drone 102 in response to a motion detection, and the main drone 102 being programmed to autonomously launch and survey the area around the motion detector in response to said signal.

The main drone may also be connected to the internet, uploading video data and other sensed environmental data to one or more servers accessible via the cloud or dedicated application software on user's mobile devices.

The wireless communications include, by way of example and not of limitation, CDMA, WCDMA, GSM, UMTS, or any other wireless communication system such as wireless local area network (WLAN), Wi-Fi or WiMAX.

It should be understood that the operations described herein, in particular the communications between the drone system and user devices such as smartphones, may be carried out by any processor.

In particular, the operations may be carried out by, but are not limited to, one or more computing environments used to implement the method such as a dedicated hosting environment, and/or one or more other computing environments in which one or more assets used by the method re implemented; one or more computing systems or computing entities used to implement the method; one or more virtual assets used to implement the method; one or more supervisory or control systems, such as hypervisors, or other monitoring and management systems, used to monitor and control assets and/or components; one or more communications channels for sending and receiving data used to implement the method; one or more access control systems for limiting access to various components, such as firewalls and gateways; one or more traffic and/or routing systems used to direct, control, and/or buffer, data traffic to components, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the method; one or more databases used to store data; one or more internal or external services used to implement the method; one or more backend systems, such as backend servers or other hardware used to process data and implement the method; one or more software systems used to implement the method; and/or any other assets/components in which the method is deployed, implemented, accessed, and run, e.g., operated, as discussed herein, and/or as known in the art at the time of filing, and/or as developed after the time of filing.

Those of skill in the art will readily recognize that the algorithms and operations presented herein are not inherently related to any computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any programming language, and it is appreciated that a variety of programming languages may be used to implement the teachings of the present invention as described herein, and any references to a specific language or languages are provided for illustrative purposes only and for enablement of the contemplated best mode of the invention at the time of filing.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the drone system have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:
1. A drone system comprising:
a main drone comprising a first propulsion system, a first power source, a first sensor array including a video camera, a first wireless communications module, a first onboard controller, and a holding cavity;

a relay drone detachably connected to the holding cavity and comprising a second propulsion system, a second power source, a second sensor array, a second wireless communications module, and a second onboard controller;

a remote control device configured to transmit control signals to the first and second onboard controllers; and a wearable headpiece comprising a display and being configured to receive signals from the first and second onboard controllers;

wherein a first onboard controller is configured to transmit data captured by the first sensor array to the wearable headpiece, including a set of video data to be displayed on the display of the headpiece so that a wearer has a first-person view of the main drone's surroundings; and wherein the first and second onboard controllers are configured with navigation algorithms configured to deploy and fly the relay drone from the main drone in coordinated flight so as to relay signals between the remote control/headpiece and the main drone through the relay drone in response to a detection of the main drone leaving communications range of the remote control and headpiece.

2. The drone system according to claim 1, wherein the holding cavity of the main drone is fitted with one or more electromagnets operated by the first onboard controller to engage or disengage the relay drone from the cavity.

3. The drone system according to claim 1, wherein the first array of sensors further includes one or more proximity sensors for assisting with the launch and reconnection between the main drone and the relay drone.

4. The drone system according to claim 1, wherein the first array of sensors further includes one or more infra-red sensors.

5. The drone system according to claim 1, wherein the holding cavity is an indented portion in an exterior body of the main drone which is profiled and sized to accommodate the relay drone.

6. The drone system according to claim 1, wherein the holding cavity is greater in width and volume than the relay drone to compensate for misalignment during reconnection between the main drone and the relay drone.

7. The drone system according to claim 1, wherein the second propulsion system of the relay drone includes a set of foldable propeller arms which are configured to move between a first folded position where they lie flat with an exterior surface of the relay drone body and a second extended position where they fold outwards from the relay drone body and are free to spin and propel the relay drone.

8. The drone system according to claim 1, wherein the headpiece is a set of goggles.

9. The drone system according to claim 1, wherein deployment of the relay drone is performed autonomously in response to a loss of signal connection between the main drone and the headpiece and remote control.

10. The drone system according to claim 1, wherein deployment of the relay drone is performed autonomously in response to a detection that signal quality between the main drone and the headpiece and remote control is below a predetermined threshold.

11. The drone system according to claim 1, wherein the first array of sensors includes motion sensors and the first onboard controller is configured with algorithms for autonomous obstacle avoidance.

12. The drone system according to claim 1, wherein the second array of sensors includes motion sensors and the second onboard controller is configured with algorithms for autonomous obstacle avoidance.

13. The drone system according to claim 1, wherein the main drone is equipped with a speaker and radio system connected to a microphone and radio system installed in the headpiece or remote control, and is thus configured to relay audio from a user to its surroundings.

14. The drone system according to claim 1, wherein the first onboard controller is configured to receive and fly a predetermined route.

15. The drone system according to claim 1, wherein the first onboard controller is configured to receive and patrol a predetermined area including one or more checkpoints.

16. The drone system according to claim 1, wherein the system further includes one or more separate motion detectors which configured to be placed about a predetermined area, the motion detectors each comprising a wireless communications module configured to send an alert signal to the first onboard controller in response to a motion detection, and the first onboard controller being configured to autonomously launch and survey an area around the motion detector in response to said signal.

17. The drone system according to claim 1, wherein the first onboard controller is in communication with one or more user devices over a wireless network and is configured to make accessible video data and other data recorded by the first array of sensors to the user devices.

\* \* \* \* \*